(12) United States Patent
Leites et al.

(10) Patent No.: US 8,881,637 B2
(45) Date of Patent: Nov. 11, 2014

(54) DOOR LOCK ACCESS CONTROL COMPONENT MOUNTING

(71) Applicant: Sargent Manufacturing Company, New Haven, CT (US)

(72) Inventors: Rick Leites, West Haven, CT (US);
John E. Walsh, Wallingford, CT (US);
Michael J. Lorello, Guilford, CT (US);
Adam O'Day, Bristol, CT (US);
Douglas A. Clark, Wallingford, CT (US); Victor Bogdanov, Manchester, CT (US); Angelo S. Arcaria, Colchester, CT (US)

(73) Assignee: Sargent Manufacturing Company, New Haven, CT (US)

( * ) Notice: Subject to any disclaimer, the term of this patent is extended or adjusted under 35 U.S.C. 154(b) by 0 days.

(21) Appl. No.: 13/835,138

(22) Filed: Mar. 15, 2013

(65) Prior Publication Data
US 2014/0260929 A1    Sep. 18, 2014

(51) Int. Cl.
*F42B 3/00* (2006.01)
*F42B 15/34* (2006.01)
*F16K 17/38* (2006.01)
*H02H 5/04* (2006.01)
*F16B 31/00* (2006.01)

(52) U.S. Cl.
CPC .................................... *F16B 31/005* (2013.01)
USPC ................. 89/1.14; 52/232; 137/75; 361/103

(58) Field of Classification Search
USPC ................. 89/1.14; 52/232; 137/75; 361/103
See application file for complete search history.

(56) References Cited

U.S. PATENT DOCUMENTS

| 416,103 | A | * | 11/1889 | Harter | 292/144 |
| 3,541,920 | A | * | 11/1970 | Rapp et al. | 89/1.14 |
| 3,644,862 | A | * | 2/1972 | Otake et al. | 337/408 |
| 3,742,414 | A | * | 6/1973 | Gittin et al. | 337/206 |

(Continued)

FOREIGN PATENT DOCUMENTS

| DE | 101 26 270 A1 | 12/2002 |
| DE | 10 2010 01708 A1 | 12/2011 |

(Continued)

OTHER PUBLICATIONS

European Patent Office, International Application No. PCT/US2014/024744 International Search Recport and Written Opinion dated Aug. 27, 2014, pp. 1-11.

*Primary Examiner* — Bret Hayes
(74) *Attorney, Agent, or Firm* — Matthew W. Witsil; Moore & Van Allen PLLC

(57) ABSTRACT

An apparatus and method for releasably mounting access control components for a door lock to a door. A base element is adapted to be mounted to the door. A first wire connector element is mounted to the base element. A mounting element with combustible material attached is provided. A second wire connector element is mounted to the mounting element, and the second wire connector element is releasably connected to the first wire connector element to mount the mounting element to the base element. A spring is provided, and a retainer holds the spring in a loaded state, but in a fire event the retainer may melt, allowing the spring to apply force to the mounting element. Alternatively, an expanding material may apply the force. The force causes the wire connector elements to disconnect and allow the mounting element to separate from the base element.

36 Claims, 5 Drawing Sheets

(56) References Cited

U.S. PATENT DOCUMENTS

| | | | |
|---|---|---|---|
| 3,975,981 A * | 8/1976 | Seifert | 89/1.14 |
| 4,442,756 A * | 4/1984 | Goans | 92/23 |
| 4,529,957 A * | 7/1985 | Hara | 337/407 |
| 4,577,544 A * | 3/1986 | Lee | 89/1.14 |
| 4,593,543 A | 6/1986 | Stefanek | |
| 5,009,456 A | 4/1991 | Eck | |
| 5,121,950 A * | 6/1992 | Davidian | 292/164 |
| 5,198,611 A * | 3/1993 | Larsen | 102/293 |
| 5,227,776 A | 7/1993 | Starefoss | |
| 5,361,676 A * | 11/1994 | Gibbs | 89/1.14 |
| 5,839,766 A * | 11/1998 | Iannuzzi et al. | 292/144 |
| 6,097,306 A | 8/2000 | Leon | |
| 6,323,750 B1 * | 11/2001 | Lampl et al. | 338/21 |
| 7,051,561 B2 | 5/2006 | Moon | |
| 8,191,939 B2 * | 6/2012 | Lin | 292/92 |
| 8,276,414 B2 | 10/2012 | Luo | |
| 8,287,010 B2 | 10/2012 | Holzer | |
| 2004/0025039 A1 | 2/2004 | Kuenzi | |
| 2005/0099262 A1 | 5/2005 | Childress | |
| 2005/0284030 A1 * | 12/2005 | Autovino et al. | 52/1 |
| 2006/0098370 A1 * | 5/2006 | Flanders | 361/103 |
| 2006/0164208 A1 | 7/2006 | Schaffzin | |
| 2006/0232372 A1 * | 10/2006 | Yoshikawa | 337/401 |
| 2007/0013476 A1 | 1/2007 | Petrovic | |
| 2007/0290793 A1 | 12/2007 | Tran | |
| 2008/0094171 A1 | 4/2008 | Sawhney | |
| 2008/0251264 A1 | 10/2008 | Eller | |
| 2009/0027194 A1 | 1/2009 | McGrath | |
| 2009/0322510 A1 | 12/2009 | Berger | |
| 2011/0316667 A1 | 12/2011 | Tran | |
| 2012/0011366 A1 | 1/2012 | Denison | |
| 2012/0169453 A1 | 7/2012 | Bryla | |

FOREIGN PATENT DOCUMENTS

| | | |
|---|---|---|
| FR | 2 807 094 A1 | 10/2001 |
| WO | WO0142594 A2 | 3/2001 |
| WO | WO 2010/144078 A1 | 12/2010 |

* cited by examiner

DOOR LOCK ACCESS CONTROL COMPONENT MOUNTING

FIELD

Aspects of the present disclosure may relate to enclosures for electronics, and in particular may relate to access control components for doors.

BACKGROUND

Achieving fire safety ratings from recognized labs is often required by local code for certain doors. A feature of a fire resistive door assembly that passes a code accepted fire test is that a fire does not ignite from components mounted to the door on an opposite side of a door from a fire. Electronic control components associated with electrical door locks need for their wire harnesses to disconnect from printed circuited (PC) boards in order to pass fire tests such that most of the combustible materials are removed from the surface of a door to avoid a fire on the door. Access control parts, which are often made of plastics and other combustible material, now in general need to be automatically removed from the face of a fire rated door in the event of a fire. Wires, which are generally made of copper, may act as a tether, keeping the access control parts, including combustible materials, attached to the door, even when the plastics that attach parts to the door have melted.

SUMMARY

Embodiments of a wire disconnection apparatus and method that may be applicable to fire applications may be realized by mounting features provided for access control components for a door lock to a door that will release or eject combustible components from the door prior to igniting, including means for automatically disconnecting wires that may otherwise tether the combustible components to the door. A spring that may be held in a loaded state by a retainer may be released to a free state when at least a portion of the retainer melts, or expandable material may expand, to apply force to cause the wires to separate at connectors.

In accordance with an embodiment disclosed herein, an apparatus for releasably mounting access control components for a door lock to a door is provided. The apparatus includes a base element adapted to be mounted to the door. At least one first wire connector element is mounted to the base element. A mounting element is provided. At least one second wire connector element is mounted to the mounting element, and the at least one second wire connector element is releasably connected to the at least one first wire connector element to mount the mounting element to the base element. A spring is provided, and a retainer holds the spring in a loaded state at normal temperatures, where normal temperatures may be considered to be the ambient temperature when there is not fire. The retainer is adapted to be mounted directly or indirectly to the door, and the spring is adapted to bias the retainer in a direction away from the door.

In some embodiments, combustible material is attached to the mounting element, and the retainer will lose strength causing the retainer to release the spring from the loaded state above a predetermined temperature that is lower than the temperature at which the combustible material will ignite. The predetermined temperature may be, for example, the melting temperature of the retainer. When released, the spring will extend to apply force to the mounting element to cause the at least one first wire connector element and the at least one second wire connector element to disconnect to allow the mounting element to separate from the base element. In some such embodiments, the loss of strength of the retainer is the result of at least a portion of the retainer melting.

In some such embodiments, the base element includes a substantially planar member and the mounting element comprises a substantially planar member. In some such embodiments, the base element comprises a printed circuit board and the mounting element comprises a printed circuit board. In some embodiments and in combination with any of the above embodiments, the spring is a compression spring, a torsion spring, an extension spring, or a leaf spring. In some embodiments and in combination with any of the above embodiments, the retainer includes a plastic, a rubber, a low melting point metal, or any combination thereof that may melt below approximately 500 degrees F.

In some embodiments and in combination with any of the above embodiments, the first wire connector element is one of male and female, and the second wire connector element is the other of male and female. In some embodiments and in combination with any of the above embodiments, the first wire connector element and second wire connector element form a mezzanine style connector. In some embodiments, the loss of strength of the retainer is the result of at least a portion of the retainer melting. In some embodiments and in combination with any of the above embodiments, at least one additional spring and at least one additional retainer are provided, with each retainer for holding a respective spring in a loaded state, where each additional retainer is adapted to be mounted directly or indirectly to the door, and each additional spring is adapted to bias a respective retainer in a direction away from the door.

In accordance with another embodiment, another apparatus for releasably mounting access control components for a door lock to a door is provided. The apparatus includes a base element adapted to be mounted to the door, and at least one first wire connector element mounted to the base element. A mounting element is provided, with combustible material attached to the mounting element. At least one second wire connector element is mounted to the mounting element, and the at least one second wire connector element is releasably connected to the at least one first wire connector element to mount the mounting element to the base element. A holder is provided that is adapted to be mounted directly or indirectly to the door. An expandable material is disposed between the base element and the mounting element, where the expandable material is capable of undergoing a volume expansion of at least approximately 5% in response to increased temperatures that are less than the ignition temperature of the combustible materials. In some embodiments, a holder adapted to be mounted directly or indirectly to the door is provided. The holder is configured as a piston having a free end and defines an internal region in which the expandable material is disposed, and the free end of the piston applies force to the mounting element in response to the expansion of the expandable material.

In some such embodiments, the expandable material will expand to cause force to be applied to the mounting element to cause the at least one first wire connector element and the at least one second wire connector element to disconnect to allow the mounting element to separate from the base element. In some embodiments and in combination with any of the above embodiments, the expandable material comprises wax or an intumescent material. In some embodiments and in combination with any of the above embodiments, the holder is configured as a piston having a free end, where the free end of the piston applies force to the mounting element in response to the expansion of the expandable material. In some embodiments, the first wire connector element and second wire connector element form a mezzanine style connector.

In accordance with another embodiment, another apparatus for releasably mounting access control components for a door lock to a door is provided. The apparatus includes at least one first wire connector element, first means for mounting the at least one first wire connector element to the door, at least one second wire connector element releasably connected to the at least one first wire connector element, and second means for mounting combustible material to the at least one second wire connector. Means are provided for urging the second means for mounting away from the first means for mounting when a predetermined temperature is exceeded, causing the at least one first wire connector element and the at least one second wire connector element to disconnect.

In some such embodiments, the means for urging includes a spring and a retainer for holding the spring in a loaded state. The retainer is adapted to be mounted directly or indirectly to the door, and the spring is adapted to bias the retainer in a direction away from the door. The retainer will lose strength causing the retainer to release the spring from the loaded state at a predetermined temperature that is lower than the temperature at which the combustible material will ignite. When released, the spring will extend to apply force to the second means for mounting to cause the at least one first wire connector element and the at least one second wire connector element to disconnect to allow the second means for mounting to separate from the first means for mounting. In some such embodiments, the retainer losing strength is caused by at least a portion of the retainer melting; the predetermined temperature may be the melting temperature of the retainer.

In some embodiments, the means for urging includes an expandable material disposed between the first means for mounting the at least one first wire connector element to the door and the second means for mounting combustible material to the at least one second wire connector. In response to increased temperature and at a temperature lower than the temperature at which the combustible material will ignite, the expandable material will expand to cause force to be applied to the mounting element to cause the at least one first wire connector element and the at least one second wire connector element to disconnect to allow the mounting element to separate from the base element. In some embodiments, the means for urging further includes a holder adapted to be mounted directly or indirectly to the door, wherein the holder is configured as a piston having a free end and defines an internal region in which the expandable material is disposed, and wherein the free end of the piston applies force to the mounting element in response to the expansion of the expandable material.

In accordance with another embodiment, a wire disconnection method for releasably mounting access control components for a door lock to a door is provided. The method includes providing a base element adapted to be mounted to the door, mounting at least one first wire connector element to the base element, providing a mounting element, and mounting at least one second wire connector element to the mounting element. The at least one second wire connector element is releasably connected to the at least one first wire connector element to mount the mounting element to the base element. The method also includes providing means for urging the mounting element away from the base element when a predetermined temperature is exceeded, causing the at least one first wire connector element and the at least one second wire connector element to disconnect.

In some such embodiments, providing means for urging includes providing one or more springs, where the force exerted by the one or more springs when released from a loaded state to a free state is greater than the force required to disconnect the first wire connector element and the second wire connector element, and maintaining each spring in a loaded state with a retainer, where each retainer is adapted to be mounted directly or indirectly the door.

In some such embodiments, the method further includes attaching combustible material to the mounting element. In response to increasing above a predetermined temperature that is lower than the temperature at which the combustible material will ignite, the one or more retainers loses strength, causing the one or more retainers to release the one or more springs from the loaded state. The one or more released springs extend to apply force to the mounting element to cause the at least one first wire connector element and the at least one second wire connector element to disconnect to allow the mounting element to separate from the base element. In some such embodiments, the retainer losing strength includes at least a portion of the retainer melting.

In some embodiments, providing means for urging includes disposing an expandable material between the first means for mounting the at least one first wire connector element to the door and the second means for mounting combustible material to the at least one second wire connector. In response to increased temperature and at a temperature lower than the temperature at which the combustible material will ignite, the expandable material will expand to cause force to be applied to the mounting element to cause the at least one first wire connector element and the at least one second wire connector element to disconnect to allow the mounting element to separate from the base element. In some such embodiments, providing means for urging further includes providing a holder adapted to be mounted directly or indirectly to the door, where the holder defines an internal region in which the expandable material is disposed.

DETAILED DESCRIPTION

The following detailed description of embodiments refers to the accompanying drawings, which illustrate specific embodiments. Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical,"

"upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Figure 1:
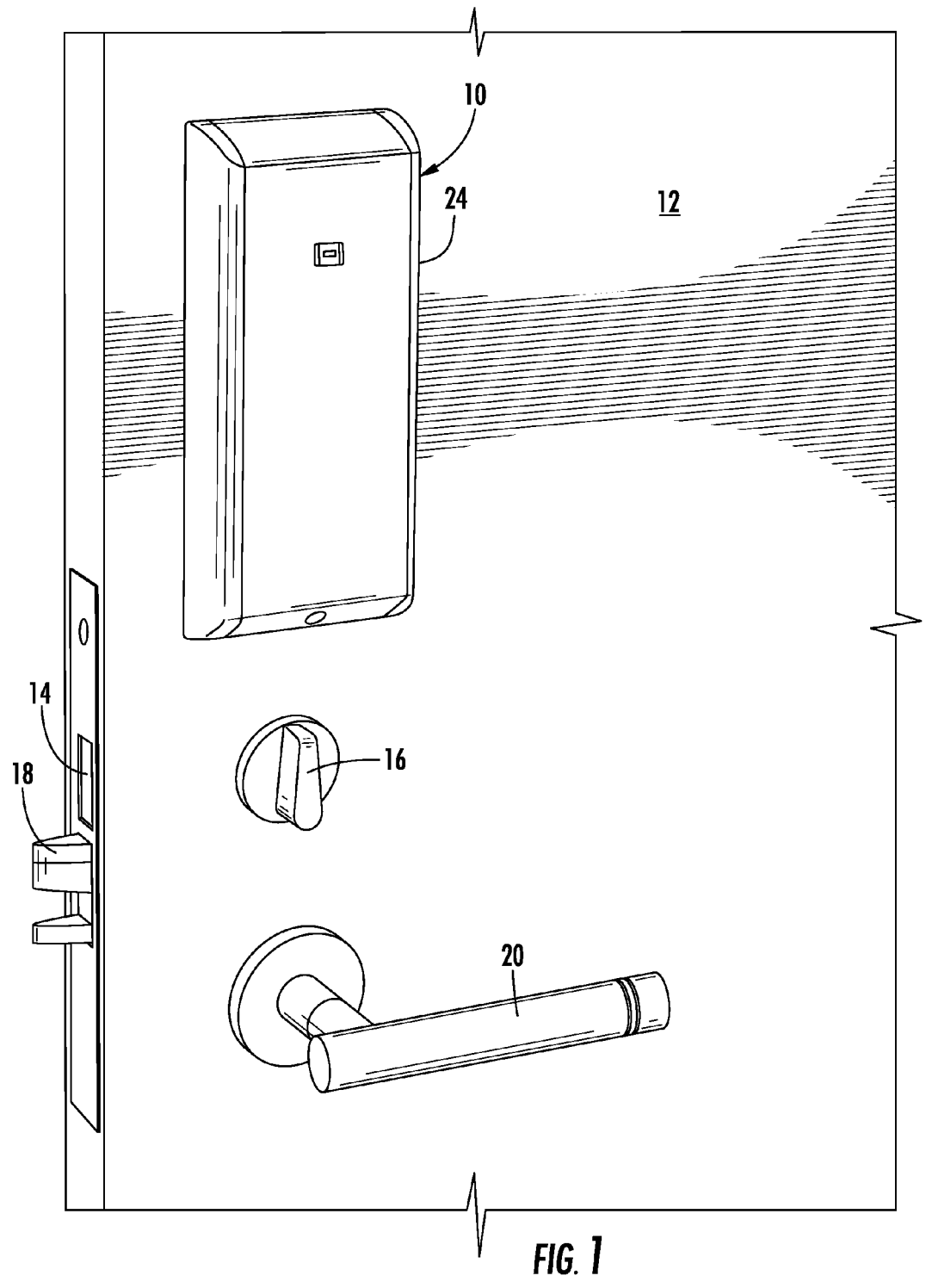
FIG. 1 is a perspective view of a door with access control components mounted thereto in accordance with an embodiment.

Referring now to the drawings, in FIG. 1 an embodiment of access control components is designated at 10. FIG. 1 shows a door 12 with the access control components 10 mounted thereto. Also included with the door 12 are an associated deadbolt 14, a thumb turn 16 to operate the deadbolt 14, a latch 18, and a latch operator 20. An enclosure 24 houses the access control components 10. In some embodiments disclosed herein and referring to FIG. 2, which shows access control components 10 at normal operating temperature, two PC (printed circuit) boards 30, 32 may be stacked back to back. The boards 30, 32 may take other forms than PC boards; for example, they may be other substantially planar members, or any shape that permits the functionality disclosed herein.

Figure 3:
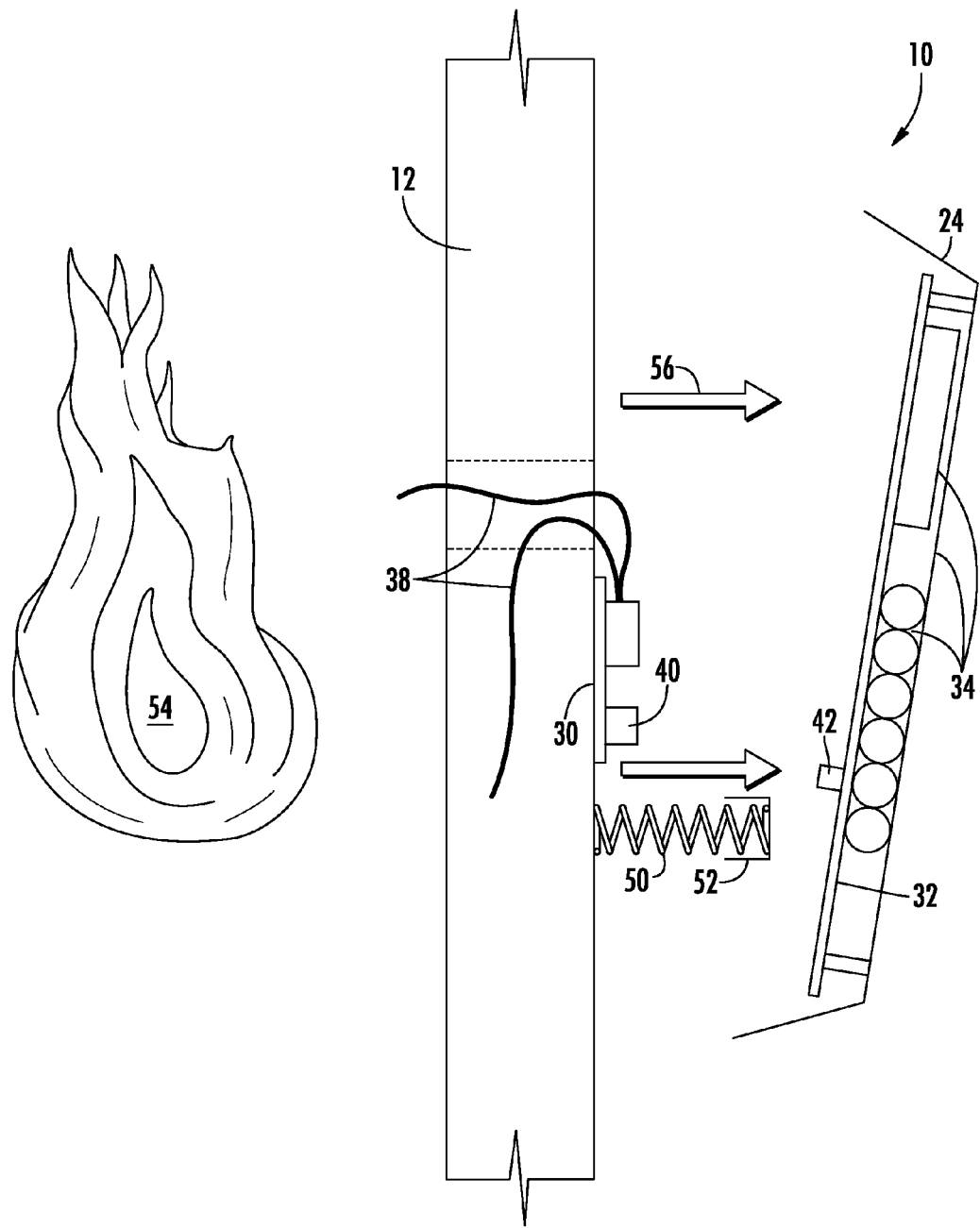
FIG. 3 is a side elevation view of a door with the wire disconnection apparatus of FIG. 2, with certain components having been released from the door.

The first PC board may be mounted to the door 12, and may be a form of a base element, or base board 30, intended to stay mounted to the door 12. The second PC board may be a form of a mounting element, which may be the main control board 32 for the door lock, and is shown in FIG. 3 to be detached from the base board 30, which may occur at elevated temperatures that may result from a fire, as discussed further below. Combustible materials 34 may be attached to or otherwise associated with the main control board 32. A material may be considered to be "combustible" for the purposes herein if it ignites within the operating temperature of a code accepted furnace, which may be between an ambient temperature, with a lower expected limit of approximately 20 degrees F., to an upper limit of approximately 2,000 degrees F. For example, combustible material may include most standard plastics, rubbers, and electronics such as capacitors or batteries.

The base board 30 may have one or more wire connectors 36 for wire harnesses 38 (which generally come from readers, lock bodies, switches, etc.), and should not be connected to combustible materials in order to meet fire safety requirements, although the presence of certain combustible materials may be acceptable, such as wire jackets and other incidental materials. The base board 30 may be rigidly attached to the door and may be designed minimally so that when left behind on the door 12, it preferably will be resistant to igniting. Between the two boards 30, 32 may be male and female connector elements 40, 42, to make connectors 36, which may be, for example, mezzanine style connectors, which transfer the signals from the harnesses 38 to the main control board 32. Other types of connectors may be used that may be disconnected by forcing the components apart.

Figure 2:
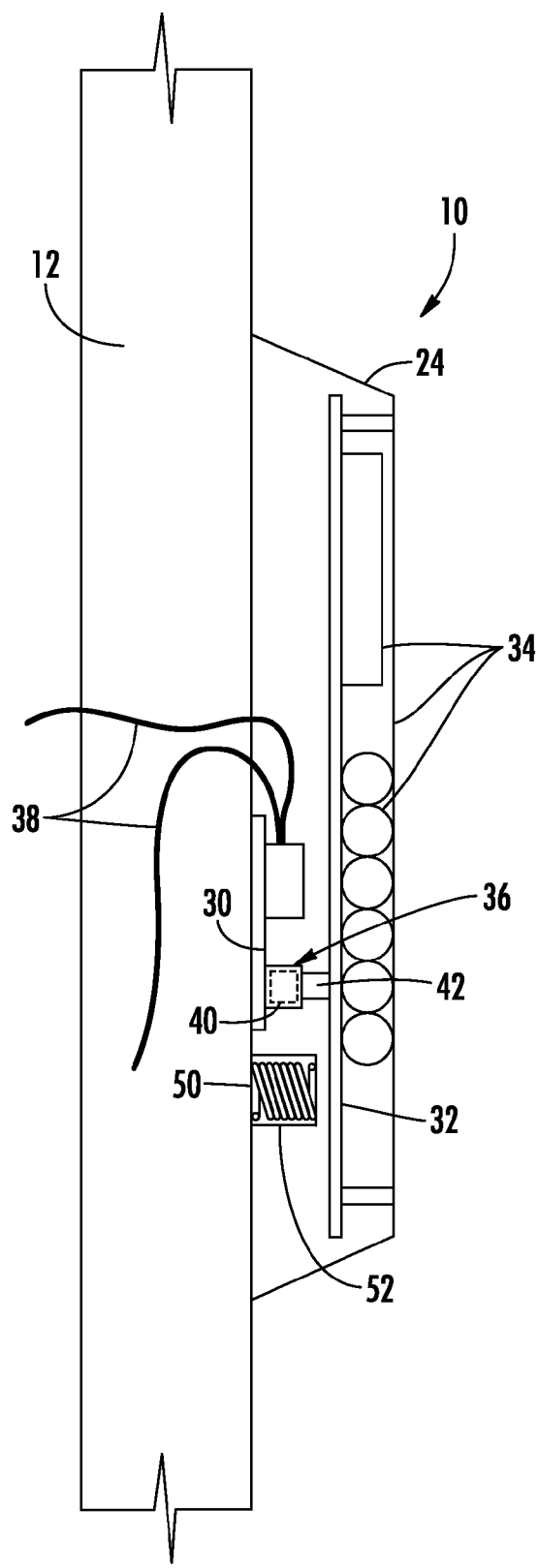
FIG. 2 is a side elevation view of a door with an embodiment of wire disconnection apparatus for the access control components of FIG. 1, with the components mounted to the door.

A trigger system may include a spring 50 that is in a compressed or "loaded" state, having relatively high potential energy, while at normal temperatures, as shown in FIG. 2. Although a compression spring is depicted in FIGS. 2 and 3, the depicted spring 50 could be and also schematically represents an appropriately configured torsion spring, extension spring, leaf spring, or the like. "Normal" temperatures could be any temperature less than the ignition temperature of the combustible materials, but might be expected to be in the range of the ambient temperature in the condition when there is not a fire, which may be expected to be from approximately 20 degrees F. to approximately 120 degrees F., as known to one of ordinary skill in the art. The nature of this spring is to act as an ejection system for the main control board 32 and the attached combustible materials 34.

The spring force may be designed to exceed the retention force of the connector 36. The spring 50 may be held compressed by a plastic holder, fastener, snap, clip, cap, or other device, as shown by retainer 52. The retainer 52 may be mounted to the base board 30 or to the door 12, either by being mounted directly to the door 12 or to the door 12 via another part, such as a backplate, and may be rigidly fixed in place. The material of the retainer 52 may be chosen to have a melting temperature lower than the ignition temperature of any of the combustible materials 34 that need to be ejected. This trigger system may be placed between the two boards 30, 32 near the wire connector 36.

As shown in FIG. 3, in a fire situation and when a spring 50 is used in the trigger system, the door may heat up from the fire 54, and resulting from the increased temperature may then melt or otherwise reduce the strength of the retainer 52 prior to igniting other material. This may release the spring 50, causing the spring 50 to extend to its free state, applying force to the main control board 32, which may cause the connector elements 40, 42 to disconnect, allowing the main control board 32 to separate from the base board 30. The spring 50 may therefore eject 56 the main control board 32 and the combustible materials safely away from the hot door. Although the retainer 52 may be made of a combustible material, it may be expected to melt away from the door or be pushed away by the spring 50, or to otherwise not have a significant impact.

As an alternative to a spring-based trigger system, the trigger system may use the properties of expandable materials. In FIGS. 2 and 3, instead of the representation of spring 50, also schematically represented is expanding material, and the retainer 52 may be considered to indicate a holder, which in one embodiment may be a piston configuration with one cylinder reciprocally received by another cylinder, although other configurations and shapes are possible. In the piston embodiment, one end of the piston may be mounted to the door 12, directly or indirectly through another part, such as the base board 30 or a base plate. The other end of the piston may slide relative to the mounted end. As the temperature increases above normal, but below the ignition temperature of the combustible materials 34, the expandable material within the piston may expand, and the piston may extend to apply force to the main control board 32. Before combustible materials attached to the main control board 32 ignite, the expandable material, through the piston, may apply force to the main control board, causing the connector elements 40, 42 to disconnect, allowing the main control board 32 to separate from the base board 30 as in FIG. 3.

In yet another embodiment schematically represented by FIGS. 2 and 3, the expandable material may simply be in disposed between the two boards 30, 32, without being disposed in an internal region of an enclosed holder, and the expandable material may apply force to the main control board 32 to cause the connector elements 40, 42 to disconnect. In this embodiment, the expandable material may be, for example, a sheet or piece of intumescent material.

The materials of the components may be selected based on melting temperatures of the components, ignition temperature of the combustible materials, and the amount of force required to disconnect the connector elements 40, 42, with the melting temperature of the retainer, or the expansion temperature of the expandable material, as applicable, preferably being well below the ignition temperature of the combustible materials. One material for the spring may be steel, although other materials may be used, so long as the spring will retain strength to apply force when the retainer melts or loses strength. In one embodiment, the spring may be AISI Type 316 stainless steel having, nominally, dimensions of 0.360 inch outside diameter, 0.875 inch long, 0.038 inch wire diameter, and 0.286 inch solid length, with a spring rate of 14 lb./inch, 5.4 active coils, and closed ends. With respect to the boards 30, 32, PC boards are generally not expected to ignite at temperatures to which the door may be heated, such as from ambient temperature (when there is no fire) to approximately 2,000 degrees F. Such a retainer material may be, for example, plastic, rubber, or low melting point metals, which may be expected to melt at least at temperatures below approximately 500 degrees F., and more particularly between approximately 200 to 500 degrees F. In some embodiments, one possible plastic that may be used is UL94V-0 Listed Polycarbonate+ ABS Blend (Bayblend FR 3010).

An expandable material may be, for example, a material that is capable of undergoing a volume expansion of at least approximately 5% in response to increased temperatures that are less than the ignition temperature of the combustible materials. One example of expandable material is thermal wax, which in general may be expected to expand in volume by approximately 10 to 15% when it melts. Other expandable materials include intumescent materials. Intumescent materials may be chosen based on the amount of pressure they exert during expansion in a restricted space, and may in some embodiments be relatively hard chars that may be produced, for example, with sodium silicates and graphite, or other materials as known to one of ordinary skill in the art. In some embodiments, some intumescent materials start to expand at approximately 250 degrees F.

Figure 4:
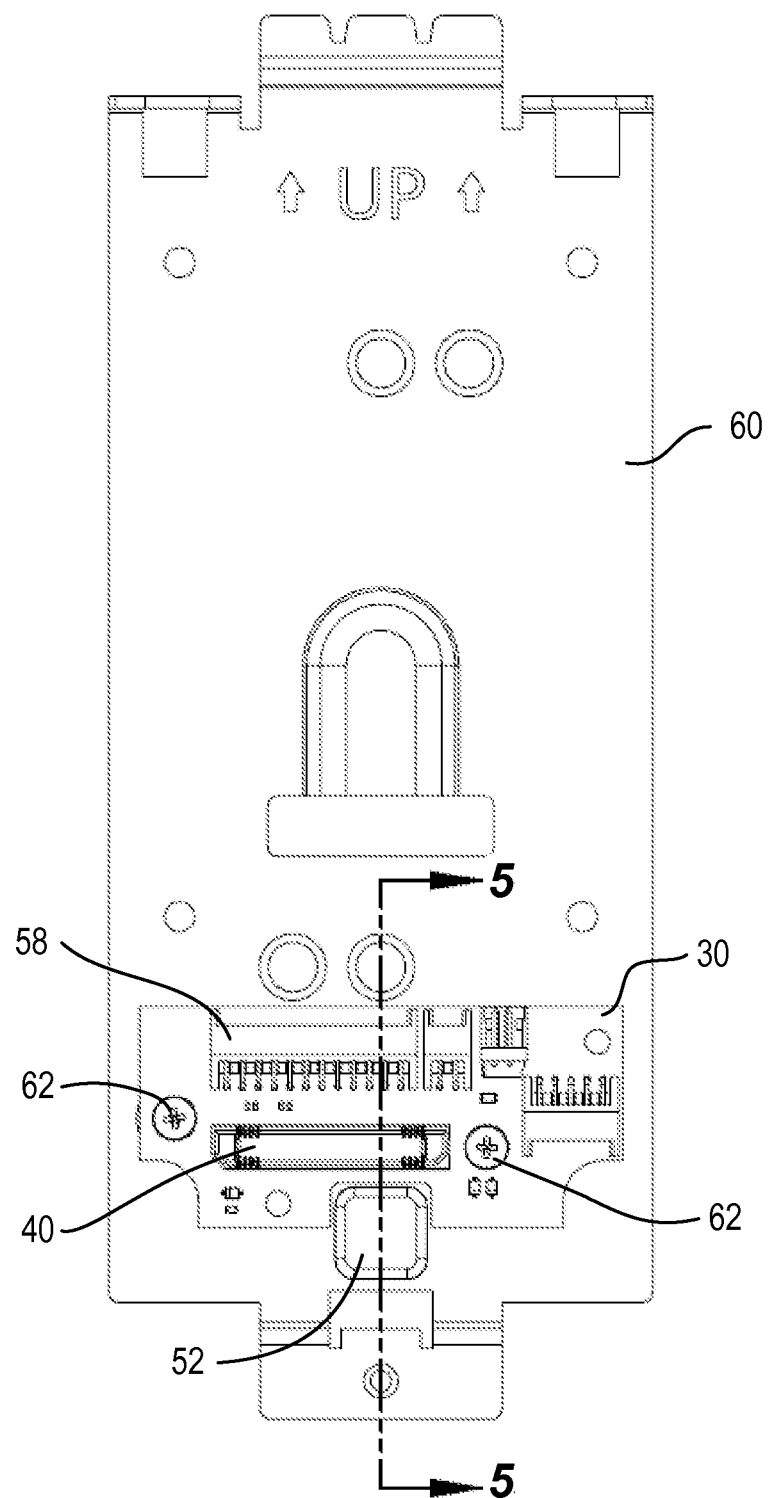
FIG. 4 is a front elevation view of a portion of the wire disconnection apparatus of FIG. 3, showing the components that may be mounted to the door.
Figure 5:
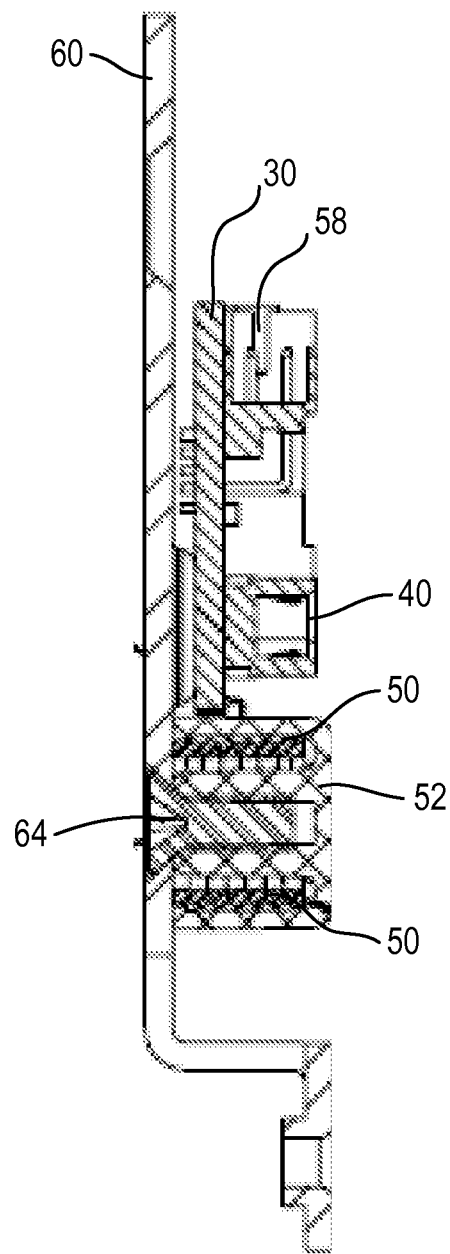
FIG. 5 is a section view of a portion of the wire disconnection apparatus of FIG. 2 taken along line 5-5 of FIG. 4.

FIGS. 4 and 5 show an embodiment of the portion of the access control components that may be mounted to the door and may remain mounted to the door after wires are disconnected. The base board 30 may be mounted to the door 12 by being mounted to a back plate 60 with screws 62. The mezzanine connector element 40 and the wire harness connectors 58 for wire harnesses 38 coming from the door 12 are mounted to the base board 30. The retainer 52 may also be mounted to the door indirectly via the back plate 60, or could be mounted in some fashion directly to the door 12. The retainer 52 in this embodiment may be formed as a cap that defines an annular space in which the compression spring 50 may be disposed.

The spring 50 is compressed or loaded in FIGS. 4 and 5. The portion of the retainer 52 that defines the interior wall of the annular space may define another central opening that is itself threaded and receives a screw 64. This screw 64 mounts the retainer 52 to the back plate 60. As described above, when the retainer loses strength, which may occur by the retainer 52 or a portion of the retainer 52 melting, the spring 50 may extend to an uncompressed or unloaded, free state, applying force to the main control board 32 to disconnect the mezzanine style connector 36 or connectors. Also as described above, the spring 50 and the retainer 52 may be replaced with other types of springs and retainers, or an arrangement for using expandable material to apply the disconnection force, such as with a piston in which expandable material is disposed. A piston preferably may be made of a material that does not melt before the expandable material expands to apply the disconnection force, as known to one of ordinary skill in the art, for example, steel or stainless steel.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Additionally, comparative, quantitative terms such as "less" or "greater" are intended to encompass the concept of equality, thus, "less" can mean not only "less" in the strictest mathematical sense, but also, "less than or equal to."

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. An apparatus for releasably mounting access control components for a door lock to a door, the apparatus comprising:
    a base element mounted to a door;
    at least one first wire connector element mounted to the base element;
    a mounting element;
    at least one second wire connector element mounted to the mounting element, wherein the at least one second wire connector element is releasably connected to the at least one first wire connector element to mount the mounting element to the base element;
    a spring; and
    a retainer that holds the spring in a loaded state, wherein the retainer is mounted directly or indirectly to the door, and wherein the spring biases the retainer in a direction away from the door.

2. The apparatus of claim 1, further comprising combustible material attached to the mounting element,
    wherein the retainer will lose strength as the result of an increase in ambient temperature causing the retainer to release the spring from the loaded state above a predetermined first temperature that is lower than the ignition temperature of the combustible material, being the temperature at which the combustible material will ignite, and
    wherein when released, the spring will extend to apply force to the mounting element to cause the at least one first wire connector element and the at least one second wire connector element to disconnect to allow the mounting element to separate from the base element.

3. The apparatus of claim 2, wherein the loss of strength of the retainer is the result of at least a portion of the retainer melting.

4. The apparatus of claim 2, further comprising access control components mounted to the mounting element.

5. The apparatus of claim 2, wherein the base element comprises a substantially planar member and the mounting element comprises a substantially planar member.

6. The apparatus of claim 2, wherein the base element comprises a printed circuit board and the mounting element comprises a printed circuit board.

7. The apparatus of claim 2, wherein the spring is a compression spring, a torsion spring, an extension spring, or a leaf spring.

8. The apparatus of claim 2, wherein the retainer comprises a plastic, a rubber, a low melting point metal, or any combination thereof that with a melting temperature below approximately 500 degrees F.

9. The apparatus of claim 2, wherein the first wire connector element is one of male and female, and the second wire connector element is the other of male and female.

10. The apparatus of claim 2, wherein the first wire connector element and second wire connector element form a mezzanine style connector.

11. The apparatus of claim 2, further comprising at least one additional spring and at least one additional retainer, each retainer for holding a respective spring in a loaded state, wherein each additional retainer is adapted to be mounted directly or indirectly to the door, and wherein each additional spring is adapted to bias a respective retainer in a direction away from the door.

12. The apparatus of claim 1, wherein the base element comprises a substantially planar member and the mounting element comprises a substantially planar member.

13. The apparatus of claim 1, wherein the base element comprises a printed circuit board and the mounting element comprises a printed circuit board.

14. The apparatus of claim 1, wherein the spring is a compression spring, a torsion spring, an extension spring, or a leaf spring.

15. The apparatus of claim 1, wherein the retainer comprises a plastic, a rubber, a low melting point metal, or any combination thereof that with a melting temperature below approximately 500 degrees F.

16. The apparatus of claim 1, wherein the first wire connector element is one of male and female, and the second wire connector element is the other of male and female.

17. The apparatus of claim 1, wherein the first wire connector element and second wire connector element form a mezzanine style connector.

18. The apparatus of claim 1, further comprising at least one additional spring and at least one additional retainer, each retainer for holding a respective spring in a loaded state, wherein each additional retainer is adapted to be mounted directly or indirectly to the door, and wherein each additional spring is adapted to bias a respective retainer in a direction away from the door.

19. The apparatus of claim 1, further comprising access control components mounted to the mounting element.

20. An apparatus for releasably mounting access control components for a door lock to a door, the apparatus comprising:
a base element mounted to a door;
at least one first wire connector element mounted to the base element;
a mounting element;
combustible material attached to the mounting element;
at least one second wire connector element mounted to the mounting element, wherein the at least one second wire connector element is releasably connected to the at least one first wire connector element to mount the mounting element to the base element; and
an expandable material disposed between the base element and the mounting element, wherein the expandable material is capable of undergoing a volume expansion of at least approximately 5% in response to increased ambient temperatures that are less than the ignition temperature of the combustible materials.

21. The apparatus of claim 20, wherein at a first temperature lower than the temperature at which the combustible material will ignite, the expandable material will expand to cause force to be applied to the mounting element to cause the at least one first wire connector element and the at least one second wire connector element to disconnect to allow the mounting element to separate from the base element.

22. The apparatus of claim 20, wherein the expandable material comprises thermal wax.

23. The apparatus of claim 20, wherein the expandable material comprises an intumescent material.

24. The apparatus of claim 20, further comprising a holder adapted to be mounted directly or indirectly to the door, wherein the holder is configured as a piston having a free end and defines an internal region in which the expandable material is disposed, and wherein the free end of the piston applies force to the mounting element in response to the expansion of the expandable material.

25. The apparatus of claim 20, wherein the first wire connector element and second wire connector element form a mezzanine style connector.

26. An apparatus for releasably mounting access control components for a door lock to a door, the apparatus comprising:
at least one first wire connector element;
first means for mounting the at least one first wire connector element to a door;
at least one second wire connector element releasably connected to the at least one first wire connector element;
second means for mounting combustible material to the at least one second wire connector;
means for urging the second means for mounting away from the first means for mounting when a predetermined temperature is exceeded, causing the at least one first wire connector element and the at least one second wire connector element to disconnect.

27. The apparatus of claim 26, wherein the means for urging comprises:
a spring;
a retainer for holding the spring in a loaded state, wherein the retainer is adapted to be mounted directly or indirectly to the door, and wherein the spring is adapted to bias the retainer in a direction away from the door;
wherein the retainer will lose strength causing the retainer to release the spring from the loaded state above a predetermined first temperature that is lower than the ignition temperature of the combustible material, and
wherein when released, the spring will extend to apply force to the second means for mounting to cause the at least one first wire connector element and the at least one second wire connector element to disconnect to allow the second means for mounting to separate from the first means for mounting.

28. The apparatus of clam 27, wherein the retainer losing strength is caused by at least a portion of the retainer melting.

29. The apparatus of claim 26, wherein the means for urging comprises:
an expandable material disposed between the first means for mounting the at least one first wire connector element to the door and the second means for mounting combustible material to the at least one second wire connector, wherein in response to increased temperature and at a temperature lower than the temperature at which the combustible material will ignite, the expandable material will expand to cause force to be applied to the mounting element to cause the at least one first wire connector element and the at least one second wire connector element to disconnect to allow the mounting element to separate from the base element.

30. The apparatus of claim 29, wherein the means for urging further comprises a holder adapted to be mounted directly or indirectly to the door, wherein the holder is configured as a piston having a free end and defines an internal region in which the expandable material is disposed, and wherein the free end of the piston applies force to the mounting element in response to the expansion of the expandable material.

31. A wire disconnection method for releasably mounting access control components for a door lock to a door, the method comprising:
providing a base element mounted to a door;
mounting at least one first wire connector element to the base element;
providing a mounting element;
mounting at least one second wire connector element to the mounting element;
releasably connecting the at least one second wire connector element to the at least one first wire connector element to mount the mounting element to the base element; and
providing means for urging the mounting element away from the base element when a predetermined first temperature is exceeded, causing the at least one first wire connector element and the at least one second wire connector element to disconnect.

32. The method of claim 31, wherein providing means for urging comprises:
providing at least one spring, wherein the force exerted by the at least one spring when released from a loaded state to a free state is greater than the force required to disconnect the first wire connector element and the second wire connector element; and
maintaining each spring in a loaded state with a retainer, wherein each retainer is adapted to be mounted directly or indirectly to the door.

33. The method of claim 32, further comprising:
attaching combustible material to the mounting element;
in response to increasing above a predetermined first temperature that is lower than the ignition temperature of the combustible material, the at least one retainer losing strength causing the at least one retainer to release the at least one spring from the loaded state; and
the at least one released spring extending to apply force to the mounting element to cause the at least one first wire connector element and the at least one second wire connector element to disconnect to allow the mounting element to separate from the base element.

34. The method of claim 33, wherein the retainer losing strength comprises at least a portion of the retainer melting.

35. The method of claim 31, wherein providing means for urging comprises:
disposing an expandable material between the first means for mounting the at least one first wire connector element to the door and the second means for mounting combustible material to the at least one second wire connector, wherein in response to increased temperature and at the first temperature lower than the ignition temperature of the combustible material will ignite, the expandable material will expand to cause force to be applied to the mounting element to cause the at least one first wire connector element and the at least one second wire connector element to disconnect to allow the mounting element to separate from the base element.

36. The method of claim 35, wherein providing means for urging further comprises providing a holder adapted to be mounted directly or indirectly to the door, the holder defining an internal region in which the expandable material is disposed.

* * * * *